R. L. HANAU.
FLOW INDICATOR.
APPLICATION FILED DEC. 17, 1918.

1,365,488.

Patented Jan. 11, 1921.

WITNESS:
R. F. Dilworth

INVENTOR.
Rudolph L. Hanau
By Max H. Srolovitz
Attorney

UNITED STATES PATENT OFFICE.

RUDOLPH L. HANAU, OF PITTSBURGH, PENNSYLVANIA, ASSIGNOR TO HYDREX ENGINEERING CORPORATION, OF BUFFALO, NEW YORK.

FLOW-INDICATOR.

1,365,488.  Specification of Letters Patent.  Patented Jan. 11, 1921.

Application filed December 17, 1918. Serial No. 267,191.

*To all whom it may concern:*

Be it known that I, RUDOLPH L. HANAU, a subject of the King of England, residing at Pittsburgh, in the county of Allegheny and State of Pennsylvania, have invented certain new and useful Improvements in Flow-Indicators, of which the following is a specification.

This invention relates to flow indicators of that class for indicating the rate of flow of liquids and gases, and has for its object to provide an apparatus of such class, in a manner as hereinafter referred to, with means for reliably and accurately indicating the rate of flow of liquids and gases.

A further object of the invention is to provide, in a manner as hereinafter referred to, a flow indicator which is readily adaptable to varying requirements in connection with the indicating of the rate of flow of liquids and gases.

This invention relates to that type of flow indicators which responds to the difference in pressure causing the flow of the liquid or gas through an opening or orifice from a receptacle, and in this invention the receptacle has arranged therein a hollow float immersed in an operating or sealing liquid, and with the float at its upper or forward portion provided with an opening for the passage of the liquid or gas. Heretofore, when employing floats in indicators of this class, the differential pressure had been brought about to act above and below the float. The pressures were transmitted through tubes which led from two suitable points arranged relative to a constricted section formed in a main or duct to above and below the float, or to a device in the form of a U-tube, or the float was suspended in the fluid or gas passing through a tapering or cone-shaped duct. In all such cases the position of the float indicated the differential pressure which, with other factors, is in a fixed relation to the rate of flow.

In accordance with this invention or construction the fluid or gas is conducted by a tube or other means to within the float and escapes through the upper or forward portion of the latter, and by this arrangement the differential pressure which is required to cause the flow of the liquid or gas from within the float, also raises the float. Associated with the float is a suitably calibrated scale whereby when the float is shifted by the differential pressure the actual flow of liquid is indicated by the position of the float with respect to the scale.

Further objects of the invention are to provide a flow indicator for the purpose set forth which is simple in its construction, strong, durable, reliable, accurate, sensitive, efficient and convenient in its use, readily set up and comparatively inexpensive to manufacture.

With the foregoing and other objects in view the invention consists of the novel construction, combination and arrangements of parts as hereinafter referred to and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts;—

Figure 1:
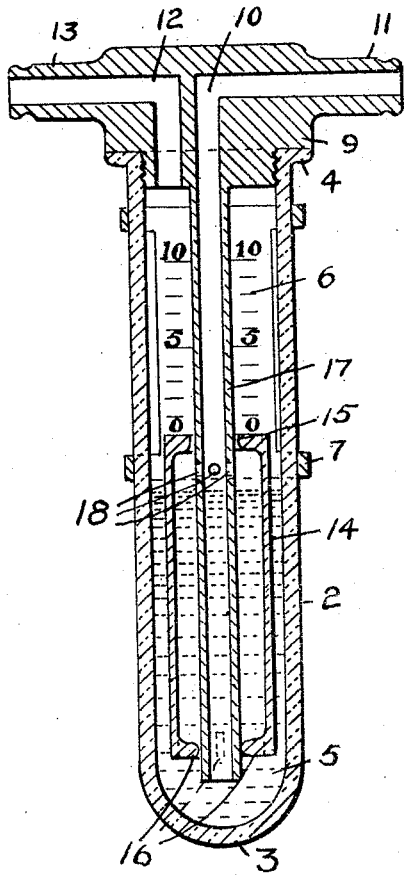
Figure 1, is a vertical sectional view of a flow indicator in accordance with this invention.

Referring to Fig. 1 of the drawings 2 denotes a receptacle preferably formed of transparent material, but it is to be understood that the lower portion thereof may be translucent or opaque and the upper portion transparent. The bottom 3 of the receptacle 2 is closed, and the top thereof open, as well as being flanged, as at 4. Arranged in the lower portion of the receptacle 2, is a body of operating liquid 5, preferably mercury.

Adjustably arranged against a portion of the periphery of the receptacle 2, at a point above the liquid 5, is a suitable body provided with a calibrated scale 6, which body is detachably maintained in position on the receptacle 2, by the retaining elements 7 extended from said body and extending around and frictionally engaging with the receptacle 2. A grip 8, is provided for shifting the position of the scale 6, when desired.

The top of the receptacle 2, is closed by a cap 9, which has threaded engagement with the inner face of the receptacle 2 at the top thereof. The cap 9 is formed with an angle-shaped inlet port 10, which at its upper end communicates with an intake nipple 11, formed integral with the cap 9 and communicating with a source of fluid or gas supply. Formed in the cap 9, is an angle-shaped outlet port 12, which at its upper end communicates with an outlet nipple 13 integral with the cap 9. The flange 4 acts as a support for the cap 9.

Suspended in the body of liquid 5 and associated with the scale 6, is a hollow cylindrical bell float 14, having its top formed with a central opening 15, although it is to be understood that the upper portion of the float can be provided with one or more openings. The bottom of the float 14, is formed with a series of inwardly extending lugs 16 constituting guides.

Formed integral with the cap 9 and extending down into the receptacle 2 and through the float 14 and into the liquid 5 is a conduit 17, in the form of a hollow tube, and which forms a continuation of the inlet port 10. The conduit 17, intermediate between its ends and within the float 14, is formed with a plurality of openings or orifices 18 for discharging the fluid or gas into or within the float 14 below the top thereof.

When the float is shifted by the differential pressure of the fluid or gas it is guided in its movement by the conduit 17, and also by the lugs 16 coöperating with the conduit 17. When the float 14 is shifted the actual flow of the liquid or gas will be indicated by the position of the float 14 with respect to the scale 6.

Figure 2:
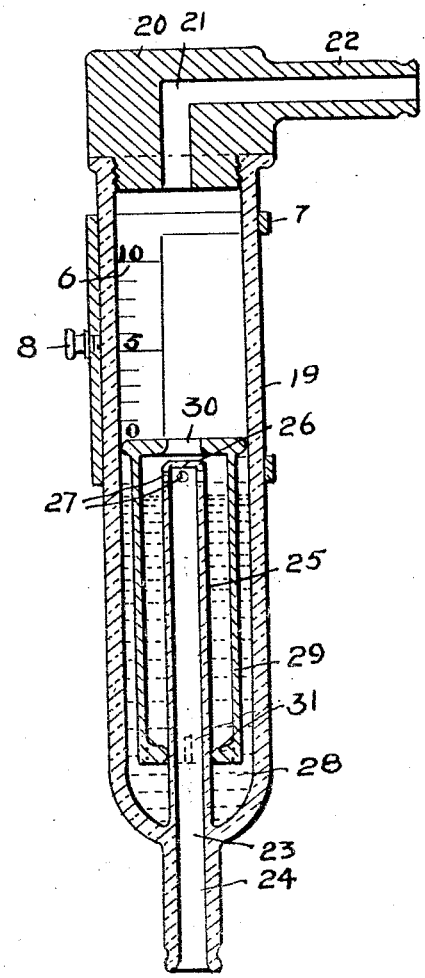
Fig. 2, is a like view of a modified form.

Referring to Fig. 2 of the drawings, in which a modified construction is shown but which also embodies the principle as embodied in Fig. 1, the receptacle is indicated at 19, and is constructed of transparent material or of any other suitable material. The receptacle 19, is open at its top for the purpose of receiving a closure cap 20, the latter having threaded engagement with the inner face of the receptacle 19. The cap 20 is formed with an angle-shaped outlet passage 21, which communicates with an outlet nipple 22 integral with the cap 20.

A calibrated scale of the same construction and arrangement as that shown in Fig. 1 is employed in connection with the construction illustrated in Fig. 2 and the same reference characters are employed therewith.

The bottom of the receptacle 19 is formed with an opening 23 and with an integral intake nipple 24 which alines with the opening 23.

Formed integral with the inner face of the bottom of the receptacle 19 and alining with the opening 23 is a vertically disposed conduit 25, which is closed at its top as indicated at 26, and below its top is provided with a series of discharge openings 27, for the fluid or gas.

Arranged within the lower portion of the receptacle 19, is a body of operating liquid 28, preferably mercury, and suspended within said liquid 28, as well as being associated with the scale 6, is a hollow cylindrical or bell float 29, having its top formed with a central opening 30. The bottom of the float 29 has a series of inwardly extending lugs 31 constituting guides.

The conduit 25 extends up through the liquid 28 and into the float 29, but does not extend through the top of the float, that is to say through the opening 30. The fluid or gas from the conduit 25 is discharged into or within the float 29 below the top thereof.

The movement of the float 29 is guided by the conduit 25 coöperating with the lugs 31.

The indicating of the flow occurs in the same manner as that referred to in connection with the construction shown in Fig. 1, that is to say, when the float 29 is shifted the actual flow of the liquid or gas will be indicated by the float 29, that is the position of the float with respect to the scale 6.

In both constructions the discharge of the fluid or gas after leaving the conduit is had through the upper portion of the float, then from the upper portion of the receptacle through the outlet passage and nipple.

What I claim is:—

1. A flow indicator comprising the combination with a liquid sealing medium of a hollow bell float suspended therein, means for supplying a fluid within the float above the sealing medium, said float having a permanently opened discharge orifice of constant area for discharge of the supplied fluid whereby the position of the float is gradually changing with the increase of flow and held in its different positions by gradually changing differential pressures.

2. A flow indicator comprising the combination with a liquid sealing medium of a hollow bell float suspended therein, means for supplying a fluid within the float above the sealing medium, said float having its upper end provided with a permanently opened discharge orifice in constant area for discharge of the supplied fluid whereby the position of the float is gradually changing with the increase of flow and held in its different positions by gradually changing differential pressures.

3. A flow indicator comprising the combination with a liquid sealing medium of a hollow bell float suspended therein, means for supplying a fluid within the float above the sealing medium, said float having its side walls imperforate and its upper end provided with a permanently opened discharge orifice of constant area for discharge of the supplied fluid whereby the position of the float is gradually changing with the increase of flow and held in its different positions by gradually changing differential pressures.

4. A flow indicator comprising a receptacle, a liquid sealing medium therein, a hollow bell float suspended within said medium, means for supplying a fluid within the float above the sealing medium, said float having a permanently opened discharge orifice of constant area for discharge of the supplied fluid whereby the position of the float is gradually changing with the increase of flow and held in its different positions by gradually changing differential pressures, said receptacle having an outlet for the flow, and a scale associated with the float to indicate by the position of the float relative to the scale the rate of flow, said scale carried by the receptacle.

In testimony whereof I affix my signature.

RUDOLPH L. HANAU.